INVENTORS
German Munding
Gerrit Lammers

March 9, 1971    G. MUNDING ET AL    3,568,445
THRUST GAS GENERATOR AND METHOD OF OPERATION
Filed Oct. 29, 1968    3 Sheets-Sheet 2

INVENTORS
German Munding
Gerrit Lammers by *McGlew and Toren*
ATTORNEYS

INVENTORS
German Munding
Gerrit Lammers by McGlew and Toren
ATTORNEYS

United States Patent Office 3,568,445
Patented Mar. 9, 1971

3,568,445
THRUST GAS GENERATOR AND METHOD OF OPERATION
German Munding, Bad Friedrichshall, and Gerrit Lammers, Neuenstadt, Germany, assignors to Bolkow Gesellschaft mit beschrankter Haftung, Munich, Germany
Filed Oct. 29, 1968, Ser. No. 771,565
Claims priority, application Germany, Nov. 20, 1967, P 16 26 070.1
Int. Cl. F02k 9/02
U.S. Cl. 60—211      14 Claims

ABSTRACT OF THE DISCLOSURE

A rocket thrust gas generator or thrust engine includes a relatively shallow depth transversely widened combustion chamber having means for introducing a liquid fuel and an oxygen carrier at separate axially spaced locations tangentially into the combustion chamber in the form of adjacent whirling flows around the combustion chamber wall. The introduction is in a manner to cause axial stratification of the propellant components which is produced by the intermittent or continuous axial juxtaposition of the two components. The shallow depth combustion chamber is provided with a weir in one embodiment which separates the tangentially directed circumferential flows of the two separate propellant components. The combustion chamber advantageously includes a centrally arranged and axially extending thrust nozzle discharge.

In accordance with the method of the invention one propellant component is directed tangentially against the walls of the combustion chamber and deposited on the wall on half the axial length of the combustion chamber periphery, and another propellant component is deposited for flow on the other axially extending peripheral portion of the combustion chamber. The propellant components are advantageously of a type which react hypergolically and they are introduced in a manner such that the reaction takes place in a transverse plane defined by the boundary between two components to form a central hot reaction layer and a substantially lenticular combustion chamber core.

SUMMARY OF THE INVENTION

This invention relates in general to the construction of a thrust gas generator and to a method of operating the generator, and in particular, to a new and useful rocket combustion engine of annular shallow depth configuration and with central axial thrust gas discharge having means for introducing at least two separate propellant components in the form of axially adjacent whirling flows around the interior periphery and to a method of operating such an engine or gas generator.

Gas generators for rocket engines having a turbulence chamber and a combustion chamber are known where two liquid propellant components such as fuel and oxygen which do not react hypergolically with each other are introduced tangentially into the turbulence chamber along with a liquid coolant. The components are introduced perpendicularly to the longitudinal axis of the combustion chamber and the introductions are staggered in a circumferential direction. Due to the different specific gravities of the water used as a coolant and the oil used as a fuel the heavier water will bear directly on the inside of the turbulence chamber and combustion wall because of the centrifugal forces acting as a result of the tangential introduction and will thus cool the walls. The fuel oil will absorb heat from the cooling liquid and the combustion chamber process and it will evaporate. The oxygen for burning is pressure-atomized when it enters the turbulence chamber. Oil vapor and oxygen vapor are mixed by the existing twist currents and the combustible mixture is ignited by a special ignition device. Due to the introduction of the fuel oil and of the oxygen, in circumferential directions at staggered locations a combustible mixture is produced from the start which fills the entire interior of the combustion chamber and which overstresses the combustion chamber wall thermally during its combustion. In order to keep the thermal stresses within tolerable limits a special coolant layer is provided in the form mentioned above and applied directly on the inside of the combustion chamber wall. Because of this coolant layer a great cooling effect is achieved avoiding a constructionally complicated regenerative cooling system so that sufficient heat protection for the combustion chamber wall is insured. However, at the same time a reduction of the specific combustion chamber output must be accepted. A system of this nature is outlined in U.S. Pat. No. 3,169,368, for example.

A similar cause of the combustion process will result from the system indicated in U.S. Pat. No. 2,654,997. In this patent it is indicated that it is known to introduce a liquid fuel and a liquid oxygen carrier into the combustion chamber through nozzles arranged tangentially to the inside of the combustion chamber wall, the fuel nozzles and the oxygen nozzles being staggered in a circumferential direction. The combustible mixture which is formed extends over the entire length of the combustion chamber but does not sufficiently thermally protect the end walls thereof. This is so because it does not seem to be possible because of the centrifugal forces to deposit a liquid film which is sufficient for the massive heat of the hot combustion core, at least in the central region of the front wall of the combustion chamber. In addition, there is the danger with small combustion chamber units and particularly with very small combustion chamber units that the amount of liquid introduced will not be sufficient, because of the low ratio between the inner surface of the combustion chamber and its volume, to produce a closed protective liquid film over the entire inner circumference of the combustion chamber. During the passage of the two propellant components into vapor on the otherwise unprotected combustion chamber wall and the mixing taking place there, regional thermal destruction would be unavoidable. Finally with successive introduction of the two propellant components in circumferential directions a mutual centrifugation takes place when one strikes the other due to the different specific gravities so that a considerable percentage of the potential cooling power does not become effective for the combustion chamber wall around the circumference.

It is also known to provide a turbulence chamber ahead of the combustion chamber proper and to introduce a propellant component such as a liquid oxygen carrier into the turbulence chamber in a form of a whirling flow which continues on the inside of the combustion chamber wall. A second propellant component such as a liquid fuel which reacts hypergolically with the oxygen carrier is atomized by a centrally arranged turbulence nozzle and arrives in a droplet form on the oxygen carrier layer into which the fuel droplets strike but without advancing up to the combustion chamber wall. Due to the special type and form of the introduction of the fuel component thermal destruction of the combustion chamber wall is avoided since the protection of the cooling oxygen carrier layer is maintained. In this known method a third liquid component, namely, the cooling medium, is saved but of relatively great length of combustion chamber is required to achieve a higher efficiency of the combustion chamber.

In accordance with the present invention there is provided a rocket combustion method of operation and a gas generator for carrying out this method which provides the advantages of the known combustion chamber methods without their disadvantages and permits an extremely short length of the combustion chamber.

The rocket combustion method and the gas generator for carrying out the method in accordance with the invention are characterized by the intermittent or continuous juxtaposition of the flows of two hypergolically reacting propellant components which are directed in a whirling flow around the walls of the combustion chamber. A liquid in vapor layer of one propellant component is deposited for protection on the inside of one half of the axially extending combustion chamber wall and one end wall of combustion chamber and a liquid in vapor layer of the other propellant component is deposited for protection of the inside of the other half of the axially extending combustion chamber circumferential wall and the opposite end wall. The layers of both propellant components react with each other in the range of the transverse central plane of the shallow depth annular combustion chamber at the location of their boundaries and form a central hot reaction layer and a substantially lenticular combustion core. Thus in contrast to the known methods of operation and to the known combustion chamber constructions both propellant components participate fully with their entire amount in their function of cooling the combustion chamber walls by direct deposit over the interior surfaces of such walls.

An apparatus for carrying out the invention includes a relatively shallow depth wide annular combustion chamber having a fuel inlet port or fuel nozzle arranged on the circumference and extending perpendicular to the longitudinal axis of the chamber and opening tangentially into the interior thereof. Oxygen carrier inlet ports or oxygen carrier nozzles extend parallel to the fuel nozzle at an axially spaced location or they may be staggered circumferentially or longitudinally in respect thereto. One or more of such fuel and oxygen carrier nozzles may be provided and may be arranged, for example, side-by-side in pairs and distributed around the complete combustion chamber circumference. Instead of nozzles the walls of the combustion chamber may be provided with inlet slots for the fuel and the oxygen carrier. The slots open toward the interior and connect tangentially into the interior circumference of the combustion chamber.

In accordance with the further feature of the invention a ring may be provided within the range of the transverse central plane of the combustion chamber, that is, centrally in respect to the shallow depth of the combustion chamber and it is arranged to project inwardly from the combustion chamber walls to form an annular overflow weir separating the two propellant components. In addition one or more guides may be arranged at the interior of the combustion chamber at a location between the two end walls thereof in a form of spiral extending inwardly from the periphery of the interior walls. These guides define a wedge-shaped gap with the inner wall of the combustion chamber which points radially outwardly. In this manner the current inside the combustion chamber receives, in addition to the energy supplied from the outside, kinetic energy by the reaction of the two propellant components which take place within the wedge-shaped gap.

In accordance with another feature of the invention one or both of the two end walls of a combustion chamber is made convex so that the radial velocity of a current is reduced and a longer stay period for the individual gas particles in the combustion chamber will be achieved.

Accordingly, it is an object of the invention to provide an improved method of operating a rocket combustion chamber which comprises introducing propellant fuel components tangentially into the combustion chamber at two axially spaced locations in a manner such that each flows along the combustion chamber wall and the components contact each other at a central boundary plane, and adding the propellant components either intermittently or continuously to permit their hypergolic reaction to form a central hot reaction layer and a substantially lenticular combustion core.

A further object of the invention is to provide a combustion chamber for the generation of thrust gases such as for a rocket engine which comprises a relatively shallow depth wide annular combustion chamber with means for introducing propellant components at two axially spaced locations in a manner such that the separate components flow in a whirling manner along the interior wall of the combustion chamber and contact each other at central boundary plane.

A further object of the invention is to provide a gas generator which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
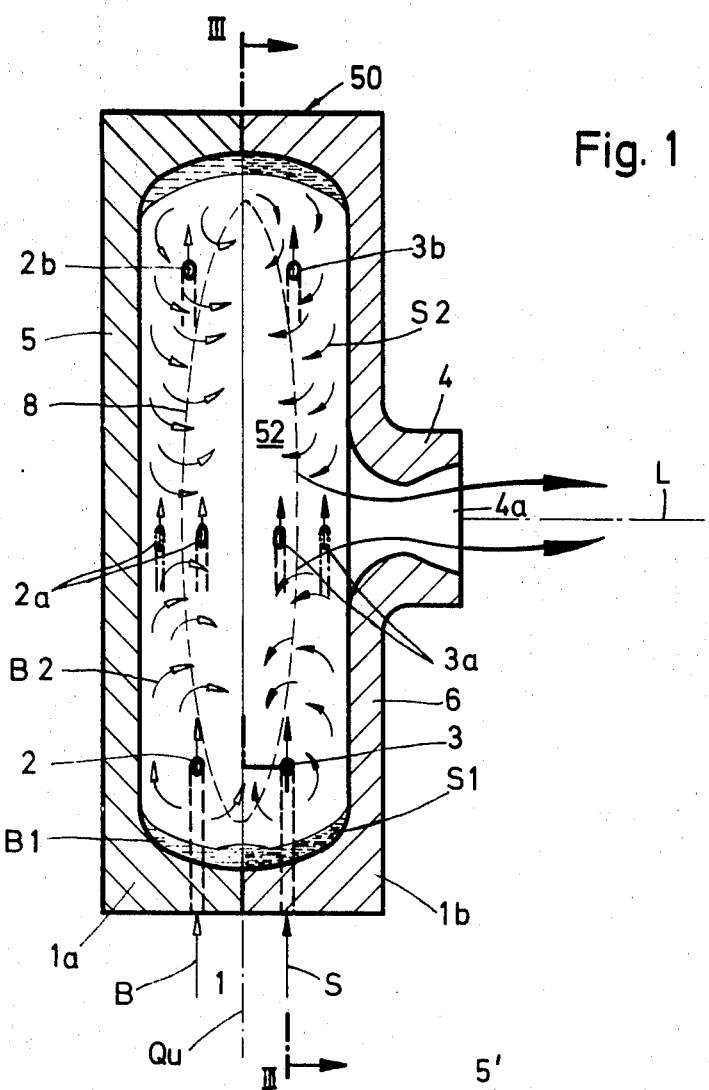
FIG. 1 is an axial sectional view of a rocket engine combustion chamber constructed in accordance with the invention.
Figure 3:
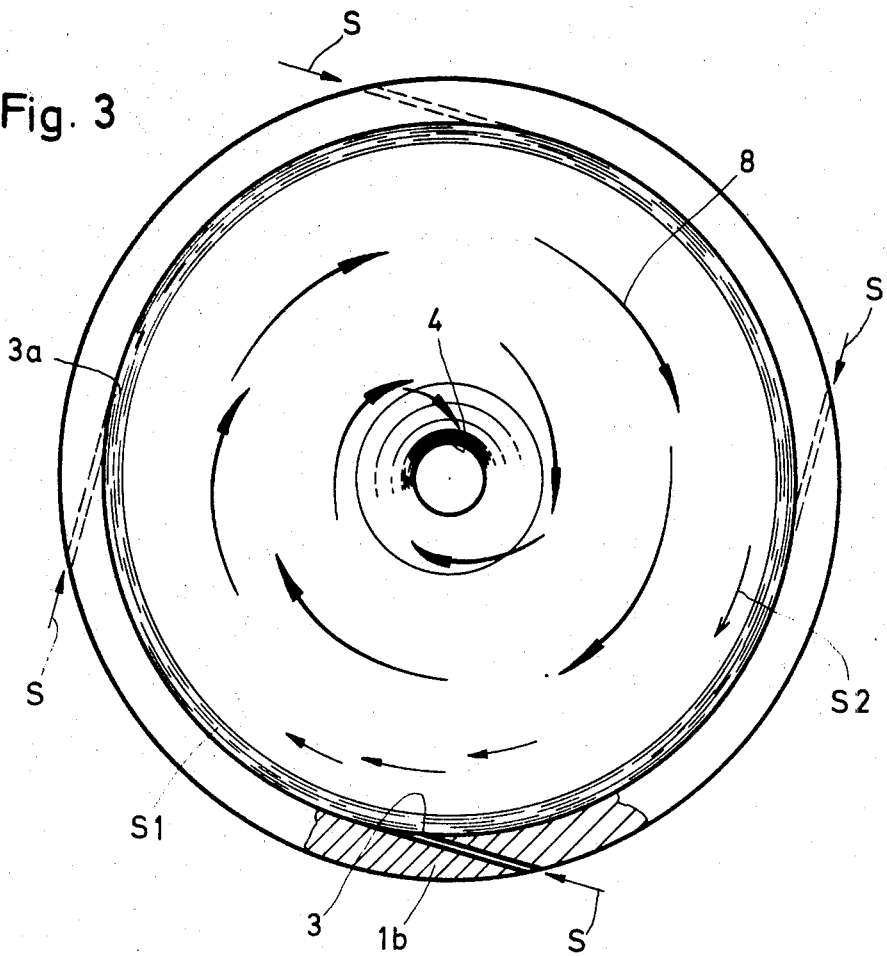
FIG. 3 is a section taken along line III—III of FIG. 1.

Referring to the drawings in particular, the invention embodied therein as indicated in FIGS. 1 and 3 comprises a rocket engine generally designated 50 which includes a cylindrical shallow depth housing generally designated 1 which is made up of two half disk portions 1a and 1b, the latter portion 1b carrying a thrust nozzle 4 having a discharge opening 4a.

In accordance with the invention a liquid fuel propellant component is introduced into the combustion chamber through one or more fuel nozzles or discharge orifices 2 which are arranged substantially perpendicular to the longitudinal axis L and tangential to the inner periphery of a combustion chamber 52 to define the interior of the housing 1.

In addition an oxygen carrier is introduced as indicated by the arrow S through one or more oxygen carrier nozzles or slot openings 3 having longitudinal axes which are perpendicular to the longitudinal axis L of the combustion chamber and which are also arranged to discharge tangentially against the interior walls of the combustion chamber 52. A plurality of double sets of fuel component nozzles 2a and 3a or single propellant component nozzles 2b and 3b are advantageously distributed around the circumference and arranged side-by-side in pairs.

In the embodiment illustrated the gases which are generated within the combustion chamber 52 are directed through the thrust nozzle and discharged through the opening 4a for the generation of a reaction but it is also possible to employ the combustion chamber as a device for producing pressurized or thrust gases for other purposes.

The housing 1 includes a front wall 5 and a rear wall 6 which include annular flanges 1a and 1b which extend in an axial direction and provide an axially extending circumferential wall of the combustion chamber along which the separate propellant components B1 and S1 are directed in the form of films or layers.

Figure 2:
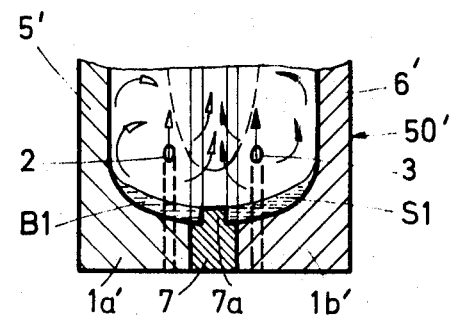
FIG. 2 is a view similar to FIG. 1 of a portion of another embodiment of rocket engine.

In the embodiment indicated in FIG. 2 a rocket engine 50' includes walls 5' and 6' which have axially extending flanges 1a' and 1b' which are separated by a ring defining an interiorly projecting weir 7a which is located between the propellant components B1 and S1.

In accordance with the method of the invention the gas generator is operated as follows: Two propellant components are introduced in a direction of the arrows B and S and caused to flow as annular half ring portions on the interior peripheral wall of the combustion chamber 52. The liquid rings B1 and S1 which are formed during the starting phase of the combustion process react hypergolically at their bounding surfaces and initiate the combustion. The stable full operation of the combustion chamber is characterized by an axially stratified symmetrical vortex having a central hot reaction layer or a central substantially lenticular combustion core 8. Due to the centrifugal and separating action of the vortex the hot combustion core 8 has a temperature which rises radially from the outside to the inside. This is because the heavy colder propellant and the oxygen particles which begin reacting with each other are moved to the outside while the hotter reaction particles have a tendency to expand radially to the inside. The thrust nozzle 4 is fed from the hot center of the combustion core 8.

During the combustion process there is also a steady locally separate evaporation of the two continuously introduced propellant components indicated at arrows B and S. Due to the juxtaposed introduction in respect to the longitudinal directions of the two components (arrows B and S) and stimulated by their tangential whirling movement a fuel evaporation layer B2 is formed bearing on the inside of the front wall 5 of the combustion chamber. In addition, an oxygen carrier evaporation S2 is formed which bears on the inside of the rear end wall 6 of the combustion chamber 52.

The cooling vapor layers B2 and S2 which form on the end walls 5 and 6, respectively, protect these walls against the hot combustion core 8. The circumferential part 1a and 1b of the walls 5 and 6, respectively, are cooled by the liquid layers B1 and S1 which is stimulated by the progressive evaporation of these layers to produce an "evaporation cold."

The hot combustion core 8 is supplied continuously from both sides in axial directions by the fuel evaporation layer B2 and by the oxygen carrier evaporation S2 having fuel vapor and oxygen carrier vapor. A temperature distribution with temperature rising radially from the outside to the inside exists in the two layers B2 and S2 due to the separating action of the vortex. This phenomenon contributes to the rapid combustion in the combustion core 8.

The hot combustion core 8 is thus kept floating according to the suggested combustion method between two vapor layers B2 and S2 which cannot react with each other in their own regions adjacent the exterior walls but will react with each other only in the region of the transverse lateral plane $Q_u$ defined between the boundaries of these two liquids. The oxygen vapor S2 also forms a cooling veil in the region of the combustion chamber outlet adjacent the nozzle portion 4 so that the construction does not require special additional cooling.

In the embodiment indicated in FIG. 2 the overflow weir 7a functions to keep away any reaction of the two propellant components directly adjacent the walls of the combustion chamber in the vicinity of the axially extending flanges 1a and 1b. During the starting phase of the combustion chamber and during the full operation thereof the liquid rings B1 and S1 will rise above the weir 7a and react together at the vortex of the weir. The ring 7 carrying the weir 7a is preferably made of a highly defractory and thermal stable material for example, of a ceramic or sintered material.

Figure 4:
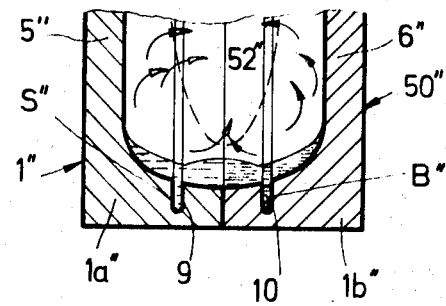
FIG. 4 is a view similar to FIG. 1 of a portion of another embodiment of rocket engine.

In the embodiment illustrated in FIG. 4 there is provided a rocket engine generally designated 50'' which includes a housing 1'' made up of end walls 5'' and 6'' which have flanges 1a'' and 1b'' which carry circumferentially extending slots 9 and 10, respectively. The slots 9 and 10 open inwardly toward the interior of combustion chamber 52''. The respective propellant components such as liquid fuel B'' and oxygen carrier S'' are introduced into the slots 9 and because of the whirling centrifugal introduction thereof they exit or discharge in a radial direction into the combustion chamber 52''.

Figure 5:
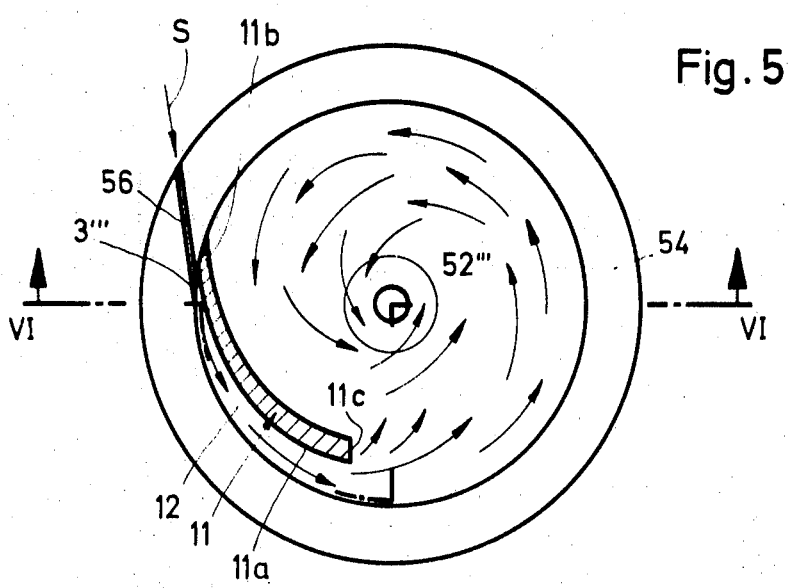
FIG. 5 is a view similar to FIG. 3 but a reduced scale of another embodiment of the invention.
Figure 6:
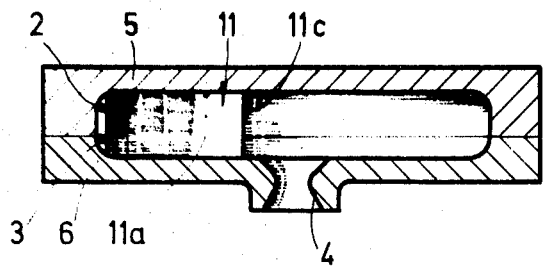
FIG. 6 is a view similar to FIG. 1 of still another embodiment of the invention.

In the embodiment illustrated in FIGS. 5 and 6, a guide 11 is provided at the interior at a combustion chamber 52'''. It extends outwardly in a spiral from the housing wall 54 at a location adjacent the inlet from an inlet duct 56 for the oxygen carrier S. A wedge-shaped gap 12 is formed between the guide phase 11a and the interior of the wall 54 which widens outwardly from the discharge nozzle or slot opening of an oxygen carrier nozzle 3'''. When several pairs of fuel nozzles are to be used additional nozzles similar to the oxygen carrier nozzles 3''' are arranged axially side-by-side. Guides 11 corresponding to this number are provided inside the combustion chamber 52'''. The guides 11 function to increase the tangential inlet velocity of the propellant components and thus increase the kinetic energy of the symmetrical vortex which is formed by the process. This causes the high reaction gases produced by the partial reaction taking place in the wedge-shaped gap 12. The gases, which have a tendency to expand in all directions, expand radially to the inside so that their expansion energy acts substantially only in a tangential direction and the circumferential velocity of the current is increased. In addition the end 11c of the guide 11 provides a sudden widening of the current at the outer end of the gap 12 to enhance the mixing of the evaporated component parts in the combustion core on the boundary surfaces between the vapor layers of the various propellant components.

The invention insures not only a fully effective two component cooling with a combustion chamber but it also provides a means for the creation of a specific powerful combustion chamber which may be of relatively small dimensions and of simple construction. Instead of liquid hypergolic propellant components, gaseous hypergolic propellant components may be employed and in such case the liquid rings B1 and S1 would become eliminated and replaced by the gaseous rings.

It should also be appreciated that the locations of the introductions of the oxygen carrier or the fuel component are interchangeable and the oxygen for example, may be admitted through the nozzles 2 of FIG. 1 and the fuel to the nozzles 3 of FIG. 1 or vice versa as previously described.

The embodiments of the combustion chamber are indicated as being of flat cylindrical configuration but other configurations are possible. The combustion chamber may be, for example, elliptical, spherical, or otherwise deviating from the cylindrical disk form indicated.

Figure 7:
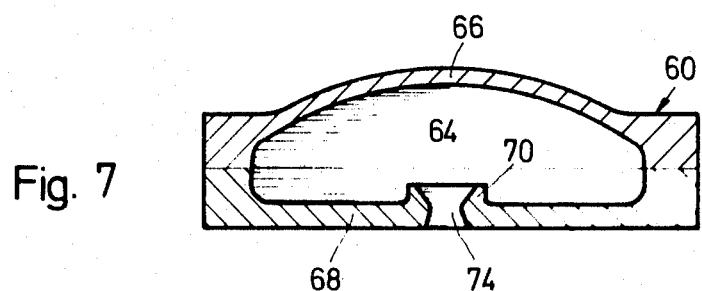
FIG. 7 is a view similar to FIG. 1 of still another embodiment of the invention.

In the embodiment indicated in FIG. 7, a rocket combustion engine generally designated 60 includes a combustion chamber 64 which may be of generally cylindrical or elliptical configuration. In this embodiment an end wall member 66 is made so that the interior of the combustion chamber adjacent this end is convex and the opposite end wall member 68 is made with a substantially straight end having a central projection 70 at the inner end of the nozzle member 74. The construction ensures that a radial velocity of the current will be reduced and a longer stay period for the individual gas particles in the combustion chamber 64 will be achieved.

Though hypergolic combustion process is the preferred combustion process of the invention, it is also possible to use non-hypergolic propellant components. In this event a certain amount of igniting mixture reacting hypergolically with one of the two propellant components is introduced into the combustion chamber to start the combustion process or if necessary one or several electrical spark plugs or glow plugs are employed either during the full operation or during some portion of the operation such as the start up.

What is claimed is:

1. A method of operating a shallow-depth cylindrical combustion chamber having an annular side wall, a closed front wall and a rear wall with a central discharge and using propellant components which react hypergolically, comprising separately introducing the fuel and oxygen components into the combustion chamber at axially spaced but circumferentially aligned locations adjacent the interior of the annular side wall of the combustion chamber tangentially and in the same directions and in a manner to create at least two separate circumferentially moving and axially side-by-side whirling flows of the components around the interior of the combustion chamber side wall and to maintain the components as separate fluid stratifications having at least one common side boundary at least one of the components being directed so as to deposit a cooling veil along the side and along at least one portion of the adjacent front wall and the other depositing a cooling veil adjacent the first cooling veil on the side wall and along at least one portion of the rear wall, the components being caused to react together hypergolically to form combustion products in a plane corresponding to the boundary between the components on the side wall of the combustion chamber and to form a central hot reaction layer and a substantially lenticular combustion core.

2. A method, according to claim 1, wherein the side wall of the combustion chamber includes an annular weir dividing said side wall and separating the two propellant components, and wherein the components are added in a quantity such that they do not overflow the weir positioned therebetween to any great extent.

3. A method, according to claim 2, wherein the discharge of the rear wall includes an axially arranged thrust nozzle, and permitting the gases which have been generated in the core to move through the axially extending nozzle for generating thrust.

4. A method, according to claim 2, wherein the side wall includes a plurality of narrow annular slots and wherein each of the propellant components is confined at least initially within a narrow slot after its introduction.

5. A gas generator for hypergolically reacting propellant components comprising a shallow-depth cylindrical combustion chamber with an annular interior side wall and an end wall at each end of said side wall, first means connected into said combustion chamber for discharging a first propellant component tangentially in a whirling first layer around said side wall adjacent one of said end walls, second means for discharging a second propellant component tangentially in a whirling second layer and in the same direction as said first layer and around said side wall adjacent the other one of said end walls and at a circumferentially aligned location alongside said first discharging means and forming a hypergolically interacting boundary with said first layer.

6. A gas generator, according to claim 5, wherein said first means for discharging a first component includes means for delivering fuel into said combustion chamber, said second means for delivering a second component comprising means for delivering an oxygen carrier into said combustion chamber.

7. A gas generator, according to claim 5, wherein one of said end walls carries a nozzle member having a discharge communicating with said combustion chamber for the axial discharge of combustion gases.

8. A rocket engine, according to claim 5, wherein said first means comprises a slot defined in the interior periphery of said side wall and opening in said combustion chamber.

9. A rocket engine, according to claim 5, including an overflow weir defined intermediate the length of said side wall and dividing said first and second propellant components along said side wall.

10. A rocket engine, according to claim 5, including a ring disposed intermediate the length of said side wall and dividing a combustion chamber into said flow portion for a first fuel component on one side and second oxidizing component on the other side of said weir.

11. A rocket engine, according to claim 5, including a guide extending inwardly from said side wall in a spiral and defining a wedge-shaped gap extending outwardly from said first nozzle.

12. A rocket engine, according to claim 11, including a second guide extending inwardly from said wall in a spiral configuration from said side wall and forming a wedge-shaped gap at the location of the discharge of said second nozzle, each of said guides extending only part way around on the interior of said side wall.

13. A rocket engine, according to claim 5, wherein one of said end walls is of convex interior configuration.

14. A rocket engine, according to claim 5, wherein one of said end walls includes a raised interior portion, said thrust nozzle extending through said second interior wall at the location within said raised interior portion.

References Cited

UNITED STATES PATENTS

| 2,286,909 | 6/1942 | Goddard | 60—258 |
| 2,602,290 | 7/1952 | Goddard | 60—258 |
| 2,654,997 | 10/1953 | Goddard | 60—265 |

DOUGLAS HART, Primary Examiner

U.S. Cl. X.R.

60—39.74, 258, 265